United States Patent
Kuck et al.

(10) Patent No.: US 6,428,204 B1
(45) Date of Patent: Aug. 6, 2002

(54) METHOD OF MAKING A COATED OPTICAL FIBER COMPRISING MEASURING THE DELAMINATION RESISTANCE OF THE COATING AT TWO DIFFERENT TEMPERATURES

(75) Inventors: Valerie Jeanne Kuck, Upper Montclair; Peter Gerald Simpkins, Chatham, both of NJ (US); Hakan Tornqvist, Gothenborg (SE)

(73) Assignee: Fitel USA Corp., Norcross, GA (US)

( * ) Notice: Subject to any disclaimer, the term of this patent is extended or adjusted under 35 U.S.C. 154(b) by 0 days.

(21) Appl. No.: 09/418,775

(22) Filed: Oct. 15, 1999

Related U.S. Application Data
(60) Provisional application No. 60/141,459, filed on Jun. 29, 1999.

(51) Int. Cl.[7] ............... G01N 25/72; G02B 6/16; C03B 37/02; C03B 37/07
(52) U.S. Cl. ............... 374/45; 73/150 A; 385/128; 427/8; 427/163.2; 65/377; 65/382; 65/484; 65/430; 65/435
(58) Field of Search ................ 374/45, 46, 53, 374/57; 73/150 A; 156/64, 378; 385/123, 126, 127, 128; 427/8, 9, 10, 162, 163.1, 163.2, 385.5, 389.7; 65/377, 382, 484, 491, 430, 435

(56) References Cited

U.S. PATENT DOCUMENTS

| | | | | | |
|---|---|---|---|---|---|
| 3,788,135 | A | * | 1/1974 | Hammond, Jr. | 73/150 A |
| 4,972,720 | A | * | 11/1990 | Wu | 374/57 |
| 5,176,028 | A | * | 1/1993 | Humphrey | 374/45 |
| 5,575,868 | A | * | 11/1996 | Mann | 156/64 |
| 5,908,484 | A | * | 6/1999 | Decker et al. | 65/377 |
| 6,014,488 | A | * | 1/2000 | Shustack | 385/128 |
| 6,222,969 | B1 | * | 4/2001 | Botelho et al. | 385/128 |
| 6,243,523 | B1 | * | 6/2001 | Aloisio et al. | 385/128 |
| 6,289,158 | B1 | * | 9/2001 | Blyler et al. | 385/128 |

\* cited by examiner

Primary Examiner—Diego Gutierrez
Assistant Examiner—Stanley J. Pruchnic, Jr.
(74) Attorney, Agent, or Firm—Lowenstein Sandler PC

(57) ABSTRACT

Making a polymer-clad optical fiber comprising a step of determining at a plurality of temperatures the delamination resistance of the polymer coating from fiber. The delamination resistance at ambient temperature can be compared with a predetermined target value for delamination resistance in use. The delamination resistance at elevated temperature can be compared with a predetermined lower target value for ease of strippability. Coated optical fiber having delamination resistances outside the predetermined ranges will typically be rejected.

8 Claims, 3 Drawing Sheets

METHOD OF MAKING A COATED OPTICAL FIBER COMPRISING MEASURING THE DELAMINATION RESISTANCE OF THE COATING AT TWO DIFFERENT TEMPERATURES

CROSS REFERENCE TO RELATED APPLICATIONS

This application claims the benefit of United States Provisional Application Serial No. 60/141,459 filed by V. J. Kuck et al. on Jun. 29, 1999.

FIELD OF THE INVENTION

This invention pertains to methods of making polymer coated optical fiber.

BACKGROUND OF THE INVENTION

Optical fibers typically are polymer coated to protect them against damage. During fiber manufacture and subsequent handling, it is necessary to maintain the interfacial bond between the (typically silica) fiber and the coating that contactingly surrounds the fiber. This coating is frequently referred to as the "primary" coating. A further coating that surrounds the primary coating is frequently referred to as the "secondary" coating.

The interfacial bond between the fiber and the primary coating desirably is strong to prevent bond failure during fiber manufacture and subsequent handling. Such failure can result in the formation of a "delaminated" area which can adversely affect the optical performance of the fiber. A delaminated area is characterized by a gap at the interface of the fiber and the primary coating. The gap alters the mechanical properties at the point of delamination, and may cause fiber transmission losses. Even if the optical performance is substantially not affected, the presence of delamination can result in negative customer perception. Thus, the fiber/primary coating bond desirably should be robust.

On the other hand, during fiber installation and many other operations it is necessary to easily and cleanly remove the coating from a portion of the fiber. For this reason it is necessary that the fiber/primary coating bond strength be not too great.

Thus the strength of the fiber /primary coating bond is an important characteristic of an optical fiber. This strength can be expressed in terms of a delamination resistance. It will also be apparent that it would be highly desirable to have a simple, reliable method of determining the delamination resistance. Such a method could be used during fiber manufacturing as a quality control method, but could also be used during development of a new coating. Such a method, and apparatus that facilitates practice of the method, is described in U.S. Pat. No. 5,908,484 issued to Decker et al. on Jun. 1, 1999 and entitled "Method of Making A Coated Fiber . . . ", which is incorporated herein by reference. The present invention is an improvement on the method and apparatus described in the Decker et al. patent.

SUMMARY OF THE INVENTION

The invention is a method of making a polymer-clad optical fiber that comprises a step of determining at a plurality of temperatures the delamination resistance of the polymer coating from the fiber.

The delamination resistance of the coated optical fiber is preferably measured at two different temperatures: advantageously at a temperature in the ambient range for fiber use (typically room temperature) and at an elevated temperature used in field stripping the fiber. The delamination resistance at ambient temperature can be compared with a predetermined target value for delamination resistance in use. The delamination resistance at elevated temperature can be compared with a predetermined lower target value for ease of strippability.

Coated optical fiber having delamination resistances outside the predetermined ranges will typically be rejected, but can be used in applications that have different delamination resistance requirements.

BRIEF DESCRIPTION OF THE DRAWINGS

The advantages, nature and various additional features of the invention will appear more fully upon consideration of the illustrative embodiments now to be described in detail in connection with the accompanying drawings. In the drawings.

It is to be understood that these drawings are for purposes of illustrating the concepts of the invention and are not to scale.

DETAILED DESCRIPTION

Figure 1:
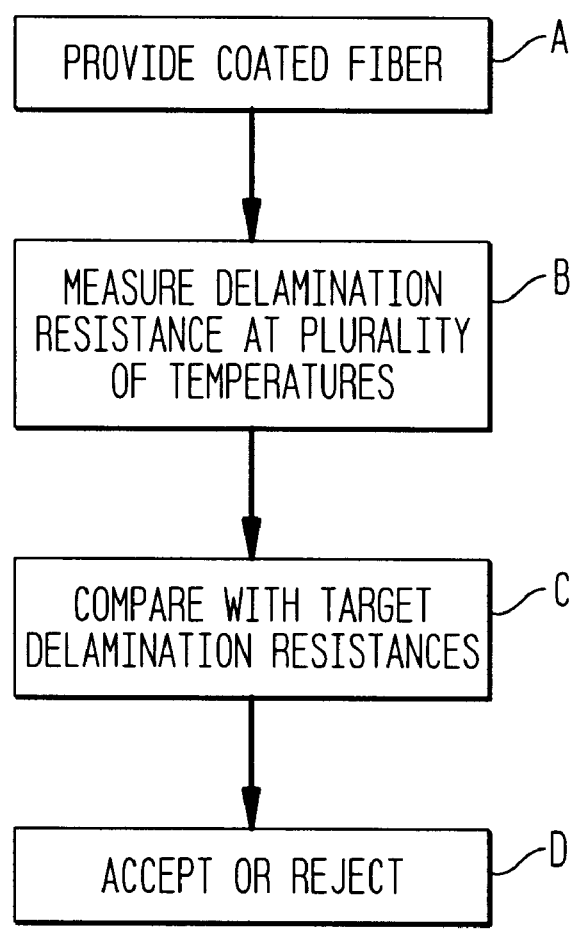
FIG. 1 is a schematic flow diagram of the steps involved in making a coated optical fiber in accordance with the invention.

Referring to the drawings, FIG. 1 is a flow diagram of the steps involved in making a coated optical fiber in accordance with the invention. The first step, shown in Block A, is to provide a polymer coated optical fiber. The coated fiber can be either a production fiber or a development fiber. The fiber can be made in the conventional manner as by providing a glass optical fiber preform, heating at least a portion of the preform in a fiber drawing furnance, drawing uncoated fiber from the heated portion and applying a polymer coating to the drawn uncoated fiber.

The next step shown in Block B, is to measure the delamination resistance of the polymer at a plurality of different temperatures. One temperature is preferably a temperature within the range of expected ambient temperatures for fiber operation (typically room temperature 15–30° C.). The other is advantageously at an elevated temperature such as the temperature used in field stripping fiber (80–200° C.).

The third step, Block C, is comparing the measured delamination resistances at plural different temperatures with a respective plurality of predetermined target delamination resistances at the respective temperatures and accepting or rejecting the coated fiber based on the comparison. In general, the delamination resistance at ambient temperature is advantagously greater than the delamination resistance at stripping temperature. Exemplary criteria for comparison are set forth in applicants' co-pending U.S. patent application Ser. No. 09/342,611 filed Jun. 29, 1999 and entitled "Coated Optical Fiber With Increased Modulus and Thermally Enhanced Strippability" which is incorporated herein by reference. For example, the criterion can be a delamination resistance at 20° C. of greater than 180 grams and a delamination resistance at a temperature in the range 100–200° C. which is less than 40% of the first delamination resistance.

Acceptance or rejection of a production fiber means acceptance or rejection for a particular application. A rejected production fiber could be used in a less demanding application. Rejection of a development fiber means modification of the chemical and/or physical properties of the primary and/or secondary polymer coating, e.g. an alteration of the degree of cure of the polymer or its chemistry.

The invention can be more clearly understood by consideration of the following specific example.

EXAMPLE

Figure 2:
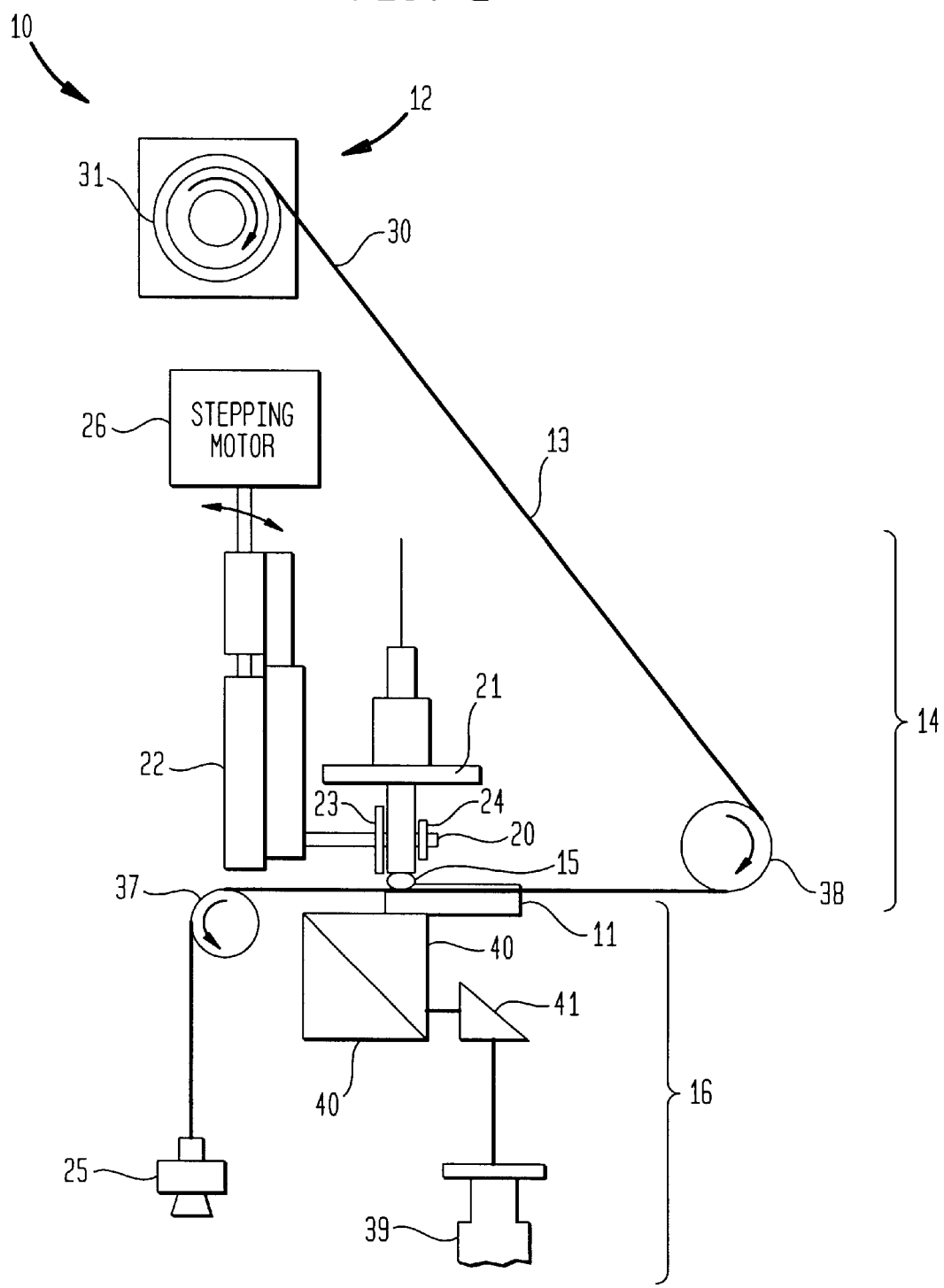
FIG. 2 schematically illustrates delamination testing apparatus useful in the process of FIG. 1.

FIG. 2 schematically illustrates exemplary apparatus 10 for measuring fiber delamination resistance at a plurality of temperatures. In essence the apparatus 10 comprises a heatable fiber support plate 11 (referred to as a miniature oven), a fiber transporter 12 (comprising payout motor 30, pulleys 37, 38 and weight 25) for moving the fiber 13 across the support plate 11, pressing apparatus 14 for pressing a rod 15 onto the supported fiber and an optical train 16 for viewing the pressed fiber.

Rod 15 can be a stainless steel rod (0.25×0.25 inch) and can be used to compress the fiber for five seconds per test. The rod 15 is attached to a free-floating aluminum plate 20 (2.5×5.0×0.25 in.) with a weight tray 21. An x-y translation stage 22 (Newport Series 462, Newport Corp., Irvine, Calif.) equipped with a 860 motorized drive is used to raise and lower the free-floating plate 20. The plate 20 is supported by two pins and stabilized between two loosely fitting vertical, capture plates 23, 24 (2.5×1.5 and 3.0 ×1.0 in.). On contact with the fiber 13, only the weight of the loaded tray, plate and rod is applied to the fiber. The fiber 13 is positioned on glass support-plate 11 (1×1.5×0.37 in). A load 25 (e.g. 2.5 gm) is attached to the free end of the fiber 13 to ensure contact with the glass plate 11 and improve the fiber pay-out. Using stepper motor 26, (VEXTA 2-phase 1.8°/step Model PK266-02A from Parker Motion and Control, Rohnert Park, Calif.), to drive the translation stage improves the efficiency of the delaminator over manual payout. A second stepper motor 30 is used to advance the fiber in increments (0.25 in. at a time) by rotating a payout spool 31 before each compressive cycle. Actuation of the stepper motors is controlled by Lab-View Version 4.0 software (National Instruments, Austin, Tex.).

Figure 3:
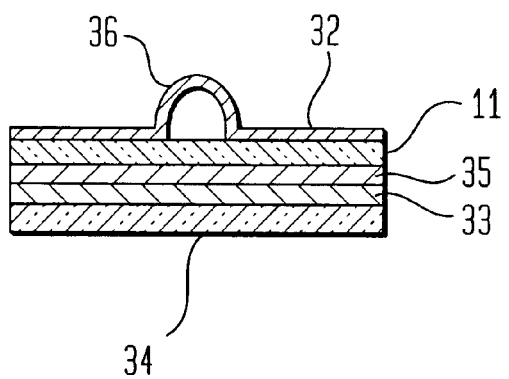
FIG. 3 is a schematic cross section of the miniature oven used in the apparatus of FIG. 2.

The fiber was heated to determine the effect of elevated temperatures on delamination resistance. FIG. 3 shows the miniature oven comprising the heated, glass support plate 11 and a cover 32 (aluminum) that retards heat loss due to convection. The glass support plate was heated by a resistive heater 33 (2×1 in. Thermofoil™ from Minco Products Inc., Minneapolis, Minn.), that was supported by a glass slide 34. Uniform thermal distribution was achieved by using a copper sheet 35 (0.020 in. thick) placed between the heater 33 and the top support plate 11. The bottom glass slide 34 functioned as both a thermal insulator and a support. The resistive heater 33 was attached to the glass slide 34 using, a pressure sensitive acrylic (Scotch® Hi Temperature Adhesive). The copper sheet 35 was glued to the resistive heater using the same adhesive.

To allow observation of the heated fiber from below during the compression stage, small windows were cut in both the resistive heater and the copper sheet. The aluminum cover 32 (0.003 in. thickness) was shaped to have a 0.06 in. wide trough along its centerline and then glued to the top glass plate. This trough 36 allowed passage of the heated fiber between the compression cycles. One edge of the aluminum cover 32 was placed adjacent to the observation window and the other end extended 1.3 in. over the heated glass plate. A thermocouple was attached next to the window and between the aluminum cover and the glass plate.

To reduce heat flow and prevent cooling of the fiber during the compressive step, the compression rod 15 was heated to the same temperature as the fiber 13. This was achieved by mounting a resistive heater (1×1 in. Thermofoil™) (not shown) on the floating plate adjacent to the rod. A thermocouple affixed to the side of the rod monitors its temperature. The voltage to the heater was manually controlled using a variable power supply.

The residence time of the fiber in the oven prior to the compressive step was 60 seconds. Pulleys 37, 38 mounted on each side of the miniature oven ensured that the fiber remained at all times in contact with the glass. The pulleys also prevented the fiber from moving transversely.

Observation of the fiber during the compressive step was accomplished using video camera 39 (Model CCD72, MTI, Michigan City, Ind.) and an attached magnification system (Zoom 6000, D.O. Industries, Rochester, N.Y,). The bottom glass slide of the miniature oven was positioned immediately over, but not in direct contact with, a quartz prisms 40, 41 that directed the optical path from the impact zone to the camera.

During delamination measurement, the loaded cylindrical steel rod 15 is placed orthogonal to the longitudinal axis of the fiber 13. Simultaneously the impacted area is examined via the video system for the formation of a delamination at the primary coating/silica interface. A minimum load is needed to delaminate the primary coating from the silica fiber. These delaminations predominately occur along a plane orthogonal to the direction of the compressive force. Smaller delaminations sometimes form on the top and bottom interfaces after the steel rod is removed. Subsequently these latter delaminations usually spread across the interface and connect with the lateral delaminations.

In the test, a fiber is exposed at each load to a series of 30 impacts that are spaced 0.25 inch apart. The rod is lowered at a speed of 1.7 mm/sec. and the fiber is compressed for a period of five seconds. The delaminations on the fiber are observed throughout the loading cycle with a black and white TV monitor.

Figure 4:
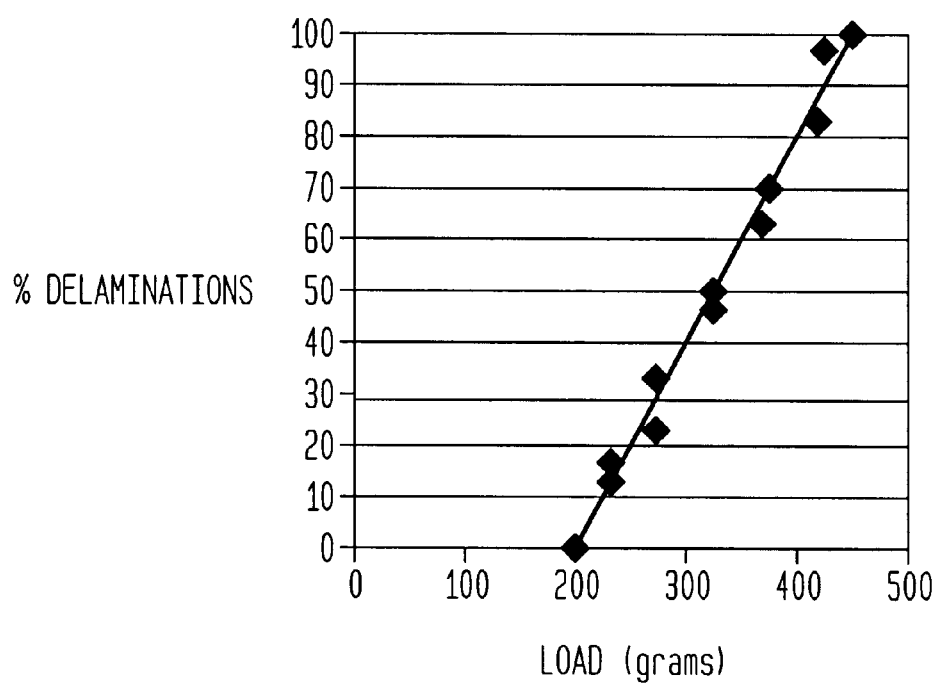
FIG. 4 is a graphical presentation of typical test results for one temperature.

FIG. 4 shows the percentage of impacted areas that form delaminations as a function of the applied load. A linear regression fit of the data yields the $D_o$, the onset of delamination, $D_{50}$, the load required to yield delaminations in 50 percent of the impacted areas and $D_{100}$, the minimum load needed to generate delaminations in all of the impacted areas. The reproducibility in the delamination performance for two data sets of thirty impacts at a given loading is good.

Previously it had been noted that some delaminations had a tendency to "heal" over time and that they could no longer be visually detected, even at high magnification. Since elevated temperatures would most likely accelerate that process, the length of the delamination was measured during the compressive step and at later times. The rate of healing was determined using an electronic caliper IMAGEN HR 1024/EM from Optec Instrument Corp., Trenton, N.J.

Delaminations generated at room temperature do not heal immediately. This characteristic has been observed with several fiber coatings. However, delaminations generated and held at elevated temperatures often undergo substantial healing within the first few seconds after the loading rod is removed from the fiber. To study this effect thirty delaminations were generated at temperatures between 40–140° C. using a high cure fiber and a load of 162 g. After removing the load from the fiber, the delaminated area was kept at the elevated temperature for 2.5 s before the fiber was advanced and allowed to slowly cool to room temperature.

The healing process of the delaminations was studied by measuring the length of each delaminations during the compressive phase, 2.5 s after compression and at later times. By plotting the mean length for each of the series of delaminations against time, the temperature dependence of the healing rate was determined. During the first five minutes after the impact, the fibers heated above the $T_g$ of the secondary coating, 80° C., decreased in length the most, while the delaminations on fibers heated to lower temperatures hardly decreased at all during the same period of time.

Another observation is that the initial mean length of the delaminations increases as the heating temperature approaches the $T_g$ of the secondary coating. At temperatures above the $T_g$, the initial length appeared to be unchanged.

We have been able to relate the mechanical properties of the coatings that were examined to the delamination performance of the fiber. At ambient temperatures there is a non-linear relationship between delamination resistance and in situ modulus of the primary coating. With increasing modulus, the delamination resistance reaches a minimum value and rapidly rises. At ribbon stripping temperatures, the delamination resistance decreases with increasing in situ modulus and seems to asymptote to a constant or slowly increasing value. These observations suggest that there is an opportunity to maximize performance by combining high delamination resistance at ambient temperatures with low delamination resistance at elevated temperatures. A superior fiber would be achieved by having a primary coating with a modulus ~130 psi.

It is to be understood that the above-described embodiments are illustrative of only a few of the many possible specific embodiments which can represent applications of the principles of the invention. Numerous and varied other arrangements can be readily devised by those skilled in the art without departing from the spirit and scope of the invention.

What is claimed:

1. A method of making and testing a polymer coated optical fiber comprising:

applying a polymer coating to an optical fiber;

determining the delamination resistance of the polymer coating at least at two different temperatures; and comparing the delamination resistance at the at least two different temperatures with predetermined target values at said temperatures; and accepting or rejecting the fiber based on the comparison.

2. The method of claim 1 wherein the at least two different temperatures include a temperature within the ambient temperature range for fiber operation.

3. The method of claim 1 wherein the at least two different temperatures include a temperature within the range of temperatures for stripping the fiber.

4. The method of claim 1 wherein the two different temperatures include a temperature in the range 15–30° C.

5. The method of claim 1 wherein the two different temperatures include a temperature in the range 80–200° C.

6. The method of claim 1 wherein the target value at the lower temperature is greater than the target value at the higher temperature.

7. Method of making a coated optical fiber comprising:

a) providing an optical fiber preform;

b) heating at least a portion of the optical fiber preform;

c) drawing uncoated optical fiber from the heated portion of the optical fiber preform; and d) applying a polymer coating to the uncoated optical fiber;

CHARACTERIZED IN THAT the method further comprises:

e) determining subsequent to application of the polymer coating, the delamination resistances of the polymer coating at a first temperature and at a higher second temperature;

f) comparing the delamination resistances determined in step e) with predetermined target values of delamination resistance; and g) if indicated by the comparing step, changing step d) such that subsequently made coated optical fiber has delamination resistances that are closer to the target values.

8. The method of claim 7 wherein the first temperature is representative of the ambient temperature of the fiber in use and the second temperature is representative of the temperature used in stripping the fiber.

* * * * *